UNITED STATES PATENT OFFICE

STUART CROASDALE, OF DENVER, COLORADO

PROCESS FOR THE EXTRACTION OF MERCURY FROM MERCURY-BEARING ORES OR PRODUCTS

No Drawing. Application filed July 9, 1929. Serial No. 377,066.

My invention relates to the extraction of mercury from mercury ores and products containing mercury in sulphide form, and it consists briefly in leaching such ores and products with a suitable solvent or lixiviant, and recovering the mercury from the lixivium thus obtained. The solvent or lixiviant may be regenerated at the same time for the treatment of new material.

The invention is based on the fact that certain metals, for example, the copper, mercury, silver group, when in a suitable solution medium are electro-negative to the sulphide salts of the other metals of that group, whereas they become electro-positive in their action when in a metallic condition.

My process consists in leaching ores or products containing cinnabar and other mercury minerals with a double salt of sodium-cuprous thiosulphate dissolved in an excess of sodium thiosulphate, commonly known and sold on the market as sodium hyposulphite or hyposulphite of soda. In this description I shall use the chemical names of the salts rather than the common or commercial names, although the salt is one and the same. The double salt of sodium-cuprous thiosulphate is not readily soluble in water but it is easily soluble in an excess of sodium thiosulphate; therefore, I use an excess of the sodium thiosulphate in making up my leaching solutions or lixiviants. It has been found that approximately not less than two and one quarter parts by weight of commercial sodium thiosulphate are required for each part by weight of commercial copper sulphate to form the desired solution of the double salt of sodium-cuprous thiosulphate in water. The chemical reaction is shown by the following equation. For the sake of simplicity, I have omitted the water of crystallization from the chemical formulae of the salts named.

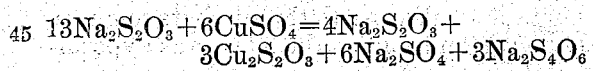

I wish it understood that I do not confine myself to any definite weights of salts in forming this solvent or lixiviant, but give the approximate weights that will form workable solutions and only confine myself to the statement that there shall be sufficient excess of sodium thiosulphate to keep the double salt of sodium-cuprous thiosulphate in solution. As a rule, the greater the excess of sodium thiosulphate in solution, the more stable the solution of the double salt becomes and there is less danger of decomposition and separation of cuprous sulphide. For example, a solution containing four and one half parts by weight of commercial sodium thiosulphate to one part by weight of commercial copper sulphate is more stable than a solution containing the proportion of salts named above.

I wish it understood also that I do not confine myself to the use of sodium thiosulphate if the thiosulphates of other alkaline metals or alkaline earths should prove more economical or suitable for leaching purposes; nor do I confine myself to the formation and use of cuprous thiosulphate in making the double salt with the alkaline-metal or alkaline-earth thiosulphate, if other metals will perform similar electromotive reactions and regenerate the lixiviant. For the sake of clearness, however, I shall confine myself in this description to the use of sodium thiosulphate and the double salt of sodium-cuprous thiosulphate.

In operating my process, the ore or product is ground to a suitable fineness that will liberate the mercury minerals and expose them to a free and quick reaction with the solvent or lixiviant. The fineness of comminution also depends on the character and condition of the mercury minerals,—whether crystalline or amorphous. The comminuted ore or product is then leached in any usual commercial manner,—by percolation, by agitation, or by counter-current methods,—with a solution of sodium thiosulphate containing the double salt of sodium-cuprous thiosulphate.

Under these conditions the sulphide of mercury in the mercury minerals is decomposed by the cuprous thiosulphate and the mercury passes into solution while copper is precipitated as cuprous sulphide as indicated by the following simplified equation:

$$Cu_2S_2O_3 + 2HgS = Hg_2S_2O_3 + Cu_2S + S$$

This equation is only illustrative, it being apparent that the reactions are probably more complicated due to the formation of other double salts or the higher thionates in the presence of an excess of sodium thiosulphate.

To the mercury in this solution, metallic copper becomes electro-positive and the mercury may, therefore, be recovered from solution by passing the lixivium over metallic copper, which will precipitate metallic mercury and regenerate the lixiviant according to the following equation:

$$Hg_2S_2O_3 + 2Cu = Cu_2S_2O_3 + 2Hg$$

In order to facilitate the recovery of the mercury, I prefer to use the substitution metal in the form of a voltaic couple, using a suitable electropositive metal, such as copper, for the anode, and a suitable electronegative element, such as mercury, as a cathode. This will generate sufficient electromotive force to precipitate the mercury from solution on the cathode while the anode, if copper, passes into solution and regenerates the lixiviant.

The mercury may likewise be recovered from the above named lixivium by means of a feeble electric current, with a density sufficiently low so as not to destroy the lixivium, and using, preferably, copper for the anode and mercury for the cathode in order to regenerate the lixivium as stated above.

As an example of the above method of treatment, I have leached an ore containing 9.2 pounds of mercury per ton with a dilute solution of sodium thiosulphate containing sodium-cuprous thiosulphate and, under similar-to-commercial conditions, have extracted all but 0.6 pound of mercury from the ore. I have taken the lixivium thus obtained and have precipitated the mercury from solution by means of metallic copper, according to each of the methods above described, and have recovered over 99% of the mercury from solution and at the same time have regenerated the lixiviant and returned it to the ore for renewed leaching and extraction.

On a different class of ore containing 34.8 pounds of mercury per ton, I have made an extraction of over 90% of the mercury from the ore and a recovery of over 99% of the mercury from solution.

What I claim and desire to secure by Letters Patent is:

1. A process for extracting mercury from sulphide ores of mercury, consisting in leaching such ores with a solution consisting of a double salt of an alkaline-metal thiosulphate or alkaline-earth thiosulphate (commonly known and sold on the market as hyposulphite) and a metallic thiosulphate, dissolved in an excess of the alkaline-metal thiosulphate, or alkaline-earth thiosulphate.

2. A process for extracting mercury from sulphide ores of mercury, consisting in leaching such ores with a solution consisting of a double salt of an alkaline-metal thiosulphate or alkaline-earth thiosulphate (commonly known and sold on the market as hyposulphite) and a metallic thiosulphate, dissolved in an excess of the alkaline-metal thiosulphate, or alkaline-earth thiosulphate, and recovering the mercury from such lixivium.

3. A process for extracting mercury from sulphide ores of mercury, consisting in leaching such ores with a solution consisting of a double salt of an alkaline-metal thiosulphate or alkaline-earth thiosulphate (commonly known and sold on the market as hyposulphite) and a metallic thiosulphate, dissolved in an excess of the alkaline-metal thiosulphate, or alkaline-earth thiosulphate, and recovering the mercury from such lixivium, by the substitution of a metal that will precipitate the mercury in a metallic condition and at the same time regenerate the lixiviant to its former potency.

4. A process for extracting mercury from sulphide ores of mercury, consisting in leaching such ores with a solution consisting of a double salt of an alkaline-metal thiosulphate or alkaline-earth thiosulphate (commonly known and sold on the market as hyposulphite) and a metallic thiosulphate, dissolved in an excess of the alkaline-metal thiosulphate or alkaline-earth thiosulphate, and recovering the mercury from such lixivium by means of a voltaic couple in which an electronegative element is used for the cathode and a more electropositive metal is used for the anode, which at the same time will regenerate the lixiviant to its former potency.

5. A process for extracting mercury from sulphide ores of mercury, consisting in leaching such ores with a solution consisting of a double salt of an alkaline-metal thiosulphate or alkaline-earth thiosulphate (commonly known and sold on the market as hyposulphite) and a metallic thiosulphate, dissolved in an excess of the alkaline-metal thiosulphate, or alkaline-earth thiosulphate, and recovering the mercury from such lixivium by means of electrolysis.

6. A process for extracting mercury from sulphide ores of mercury, consisting in leaching such ores with a solution consisting of a double salt of an alkaline-metal thiosulphate or alkaline-earth thiosulphate commonly known and sold on the market as hyposulphite) and a metallic thiosulphate, dissolved in an excess of the alkaline-metal thiosulphate, or alkaline-earth thiosulphate, and recovering the mercury from such lixivium by means of electrolysis in a cell having an electronegative element for the cathode and having a metal for the anode, that will regenerate the lixiviant to its former potency.

7. A process for extracting mercury from sulphide ores of mercury, consisting in leaching such ores with a double-salt of an alkaline-metal thiosulphate and cuprous thiosulphate, dissolved in an excess of the alkaline-metal thiosulphate.

8. A process for extracting mercury from sulphide ores of mercury, consisting in leaching such ores with a double-salt of sodium-cuprous thiosulphate dissolved in an excess of sodium thiosulphate.

In testimony whereof I have affixed my signature.

STUART CROASDALE.